US011487807B2

(12) United States Patent
Eldahry

(10) Patent No.: US 11,487,807 B2
(45) Date of Patent: Nov. 1, 2022

(54) SYSTEM FOR PROVIDING LOCATION-BASED MULTIMEDIA

(71) Applicant: Hanan K. Eldahry, Pelham, NY (US)

(72) Inventor: Hanan K. Eldahry, Pelham, NY (US)

( * ) Notice: Subject to any disclaimer, the term of this patent is extended or adjusted under 35 U.S.C. 154(b) by 48 days.

(21) Appl. No.: 16/900,408

(22) Filed: Jun. 12, 2020

(65) Prior Publication Data

US 2021/0390132 A1    Dec. 16, 2021

(51) Int. Cl.
*G06F 16/487* (2019.01)
*G06F 16/438* (2019.01)
*G06F 16/435* (2019.01)
*G06Q 50/16* (2012.01)

(52) U.S. Cl.
CPC .......... *G06F 16/487* (2019.01); *G06F 16/435* (2019.01); *G06F 16/438* (2019.01); *G06Q 50/16* (2013.01)

(58) Field of Classification Search
CPC ..... G06F 16/487; G06F 16/435; G06F 16/438
USPC ......................................................... 707/732
See application file for complete search history.

(56) References Cited

U.S. PATENT DOCUMENTS

| | | | |
|---|---|---|---|
| 6,321,158 B1* | 11/2001 | DeLorme | G01C 21/26 340/995.16 |
| 2003/0182052 A1* | 9/2003 | DeLorme | G01C 21/3679 701/533 |
| 2013/0249948 A1* | 9/2013 | Reitan | G06T 19/006 345/633 |
| 2014/0164322 A1* | 6/2014 | Beaurepaire | G01C 21/3688 707/610 |
| 2019/0120654 A1* | 4/2019 | Todasco | G01C 21/3679 |
| 2020/0041289 A1* | 2/2020 | Mokhnatkina | G06Q 50/14 |

* cited by examiner

*Primary Examiner* — Kimberly L Wilson
(74) *Attorney, Agent, or Firm* — Whitmyer IP Group LLC

(57) ABSTRACT

A system having a computer, a database for storage and retrieval of real estate data, an agent/owner computing device in remote data communication with the computer, at least two geolocations provided to the computer by the agent/owner computing device, a multimedia recording device connected to the agent/owner computing device, at least two multimedia presentations captured by the multimedia recording device and transmitted to the computer by the agent/owner computing device, a route created by software on the agent/owner computing device associating at least one of the multimedia presentations with each of the geolocations, the route uploaded to the computer for storage on the database, a user computing device including a display and speakers for remotely accessing the route through the computer, and a variable presentation path generated by software on the computer by combining a route requested by the user computing device with a geolocation of the user computing device.

16 Claims, 2 Drawing Sheets

SYSTEM FOR PROVIDING LOCATION-BASED MULTIMEDIA

TECHNICAL FIELD

The invention relates to providing geolocation-based real estate content.

BACKGROUND

Housing is a complex market. People choose where to live based on a wide variety of factors, including work, family, culture, or other interests. As a result, over 12.2M U.S. households relocate over long distances every year.

When relocating over long distances, however, the remote home seeker, whether they intend to buy or rent, has limited knowledge of remote neighborhoods. She also has little time for the frequent travel required to visit listing and explore areas. Still, many home seekers want to take a do-it-yourself approach and not engage a real estate agent until later in the process. Scouring websites and forums is cumbersome and leaves the remote home seeker disconnected from the remote area and its culture. While local newspapers and online websites can help bridge the gap, is expensive to purchase multiple subscriptions.

In addition, real estate agents face an uphill battle in finding new clients. Agents spend $6.9 billion every year on marketing, at about $5,000 per agent. Lead generation, especially for remote clients, is costly and difficult for the realtor. Real estate agents, especially those that have lived and worked in an area for years, have firsthand personal knowledge regarding local neighborhoods and their characteristics. The earlier a real estate agent may have access to a potential client, especially a remote client unfamiliar with an area, the more likely they are to impart that knowledge and help the remote home seeker find the right home. In other words, a real estate agent wants to increase their branding, marketing and lead generation.

A home owner may also be interested in providing information about their home and its neighborhood in order to increase property values and/or attract interest to their home. In addition, a neighborhood expert may also want to promote an area, and its businesses, attractions, and way of life based on their knowledge and passion.

There is a need to provide remote home seekers with qualified information. In addition, there is a need to provide remote home seekers with an option that allows them to contact a real estate agent later in the search process. There is also a need to provide real estate agents with a cheap and effective way to connect with home seekers.

SUMMARY

An object of the invention is to provide virtual routes and local insight about places and communities for people looking to move to a new home.

Another object of the invention is to connect home seekers with neighborhood experts to find the perfect community.

Another object of the invention is to provide personalized audio/narrations on an interactive map.

Another object of the invention is to provide a mobile platform where home seekers gain a valuable, more immersive experience.

Another object of the invention is to allow realtors to reduce marketing spend.

Another object of the invention is to provide advanced search and filter features.

In one aspect of the invention, a system for providing curated real estate data is provided having a computer, a database accessible to said computer for storage and retrieval of real estate data, an agent/owner computing device in remote data communication with said computer, at least two geolocations provided to said computer by said agent/owner computing device, a multimedia recording device connected to said agent/owner computing device, at least two multimedia presentations captured by said multimedia recording device and transmitted to said computer by said agent/owner computing device, a route created by software on said agent/owner computing device associating at least one of said multimedia presentations with each of said geolocations, said route uploaded to said computer for storage on said database, a user computing device including a display and speakers for remotely accessing said route through said computer, and a variable presentation path generated by software on said computer by combining a route requested by said user computing device with a geolocation of said user computing device, such that if said user computing device is near a geolocation of the requested route said variable presentation path includes travel directions, and if said user device is far from a geolocation of the requested route said variable presentation path includes a street view.

DETAILED DESCRIPTION

Figure 1:
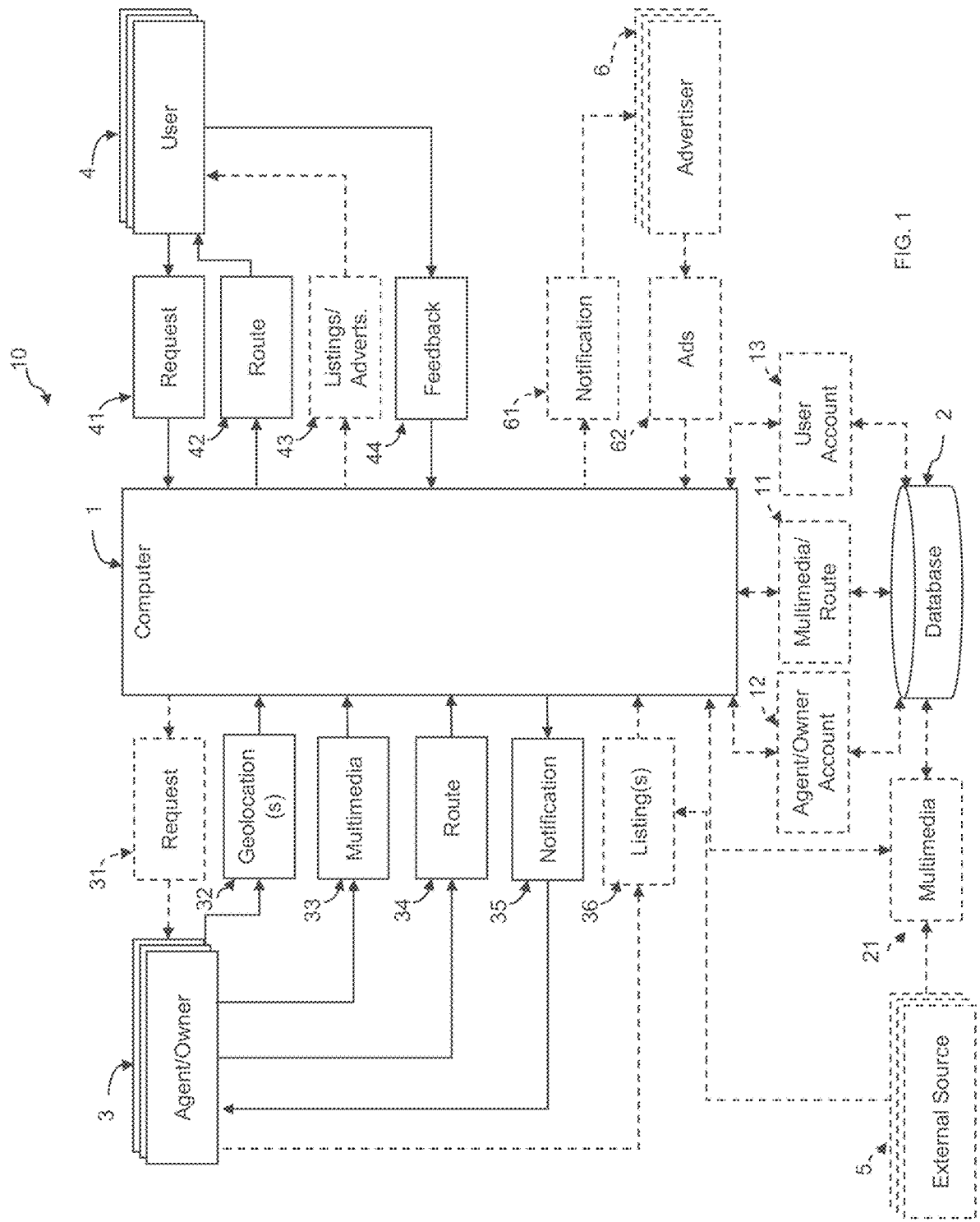
FIG. 1 is a schematic diagram of the presently disclosed system.

Referring to FIG. 1, the present disclosure describes a system 10 for providing geolocation-based content.

The system 10 includes a computer 1. The computer 1 may be a processor, remote computer, computer server, network, or any other computing resource, including mobile devices.

The computer 1 may also be in communication with a database 2. The database 2 may store information regarding the system 10, including multimedia and routes 11. The database 2 may be a storage drive or array accessible to computer 1, or cloud storage.

The computer 1 may be in data communication with agent/owner computing device 3. The agent/owner computing device 3 may be associated with a real estate agent, a homeowner, or a neighborhood expert. Agent/owner computing device 3 may be a computer, laptop, smartphone, tablet, or other electronic device, including mobile devices, capable of transmitting data to the computer 1. Agent/owner computing device 3 may also include cloud databases accessible to such an electronic device, such as Dropbox or OneDrive. Agent/owner computing device 3 may run an application on a mobile device or smartphone. The agent/owner computing device 3 may be used by a single agent/owner, or may be multiple agents, such as from the same office, or co-owners. The agent/owner computing device 3 may include a multimedia recording device for capturing audiovisual data, such as a microphone and/or still or video camera. Agent/owner computing device 3 may have an input device such as a mouse and keyboard, touchscreen, trackpad, etc. Agent/owner computing device 3 may have a global positioning system device for determining a geolocation of the user device 4.

The agent/owner computing device 3 may be associated with one or more agent/owner accounts 12. The agent/owner account 12 may include information about the agent/owner, including a photo, a video, a first and last name, a company name, a company website, a phone number, an email address, a profile description, and a state real estate license. Agent/owner accounts 12 may be stored in and retrieved from the database 2 by the computer 1.

The computer 1 may be in data communication with user computing device 4. The user computing device 4 may be associated with at least one home seeker. User computing device 4 may be a computer, laptop, smartphone, tablet, or other electronic device capable, including mobile devices, of transmitting data to the computer 1. User computing device 4 may have a display for displaying audiovisual data, such as a screen and/or speakers. User computing device 4 may run an application on a mobile device or smartphone. User computing device 4 may have an input device such as a mouse and keyboard, touchscreen, trackpad, etc. User computing device 4 may have a global positioning system device for determining a geolocation of the user computing device 4. The user computing device 4 may include a virtual reality headset.

The user computing device 4 may also be associated with a user account 13. The user account 13 may include information about the home seeker, such as a photo, a video, a first and last name, a phone number, an email address, and a city and state of current residence. User accounts 13 may be stored in and retrieved from the database 2 by the computer 1.

The computer 1 may also be in communication with an external source 5. The external source 5 may provide information to the system 10, including multimedia 21 or listings 36. The external source 5 may be a third-party source, such as a third-party website or database. The external source 5 may be MLS.

The computer 1 may be in data communication with advertiser computing device 6. Advertiser computing device 6 may include a computer, laptop, smartphone, tablet, or other electronic device capable of transmitting data to the computer 1.

The computer 1 may receive one or more geolocations 32 from an agent/owner computing device 3. The geolocation 32 may be from an agent representing a home or property owner in a real property listing, or the owner themselves. The geolocation 32 may or may not be the geolocation at which the agent/owner device 3 are physically, such as determined by a global positioning system or the Internet. The geolocation 32 may be indicative of a famous location, intersection, tourist spot, restaurant, local hot spot, park, or nature preserve. The geolocation 32 may be selected from a list of options, selected from a map, may be searched for, or may be otherwise inputted.

The computer 1 may also receive a multimedia presentation 33. The multimedia presentation 33 may include one or more of a sound recording, video recording, pictures, or other multimedia. The multimedia presentation 33 may be pre-recorded or saved, or may be recorded right before being uploaded to computer 1.

The multimedia presentation 33 may be indicated to be associated with the geolocation 32. If the multimedia presentation 33 is recorded on the agent/owner device 3 using a multimedia recording device, the multimedia presentation 33 may be automatically associated with a geolocation if the agent/owner device 3 has a global positioning system device. Alternatively, a geolocation may be determined by an internet connection of the agent/owner device 3. The multimedia presentation 33 may include spoken information by someone who lives or has lived by the associated geolocation 32, such as in the neighborhood. The multimedia presentation 33 may be associated with a time of day, such as a video of the geolocation 32 at sunrise or sunset.

The multimedia presentation 33 may also be selected from an external source 5. External source 5 may provide multimedia presentations 21 that are selectable by the agent/owner device 3 for association with a geolocation 32. Multimedia presentation 21 may be saved in database 2.

The agent/owner device 3 may associate at least one of the multimedia presentations 33 and with at least one geolocation 32 into a route 34. The route 34 may specify an order of the geolocations 32, such as to coincide with a route of a neighborhood. No order, or an order for only some of the geolocations for the route 34 may also be specified. The route 42 may contain a single geolocation 32 and a single multimedia presentation 33. The agent/owner device 3 may provide the route to the computer 1.

The route 34 may include additional information such as the date it was created and identifying information about the agent/owner that created it, such as from the agent/owner account. For instance, a link to an agent/owners profile or web page may be provided that includes information such as an image, biographical information, an intro video and/or contact information. Additionally, the agent/owner computing device 3 may indicate that it wishes to sponsor or promote a route so as to have it appear higher in search results.

The computer 1 may store the route 34 in the database 2. The geolocations 32 and multimedia presentations 33 may also be saved to the database 2.

The computer 1 may receive a request 41 from user computing device 4. The request 41 may include a geolocation where the user computing device 4 may be seeking to purchase property. The geolocation provided by the user computing device 4 may be an area rather than a specific place or point. The geolocation may or may not be the geolocation at which the user computing device 4 or their device are physically. The request 41 may also include personal information about the user, such as the user's name, age, sex, current home address, zip code, or general area. The request 41 may also include preferences for a potential home, such as the neighborhood, number of bedrooms, bathrooms, price, home type, etc. Information from the request 41 may be saved in the database 2. Alternatively, this information may be retrieved from the user account 13.

The request 41 from the user computing device 4 may be provided at least in part as request 31 by the computer 1 to the agent/owner device 3, to provide information about potential clients or show neighborhoods where users are seeking homes. The computer 1 may receive geolocations 32, multimedia presentation 33, and routes 34 from the agent/owner computing device 3 in response, which may be based at least in part on the personal information provided by the user computing device 4. For example, an agent may wish to showcase local museums to an artist. The computer may send the route 42 to the user computing device 4, which may include an identification of the particular agent/owner.

In response to the request 41, the computer may display a list of routes 42 to the user computing device 4 prepared by agent/owners. The list may include sponsored and/or promoted routes 42. The user may filter and select route 42 for display, such as by real estate agent, geolocation, or other categories.

A user may select a route for viewing. The computer 1 may generate a variable presentation path based on the route 42 and a geolocation of the user computing device 4. For example, if the user computing device 4 is near a geolocation of the requested route 42 the variable presentation path may include travel directions. Alternatively, if said user computing device 4 is far from a geolocation of the requested route 42 said variable presentation path may include a street view, panorama, or other 360 degree view, collectively referred to herein as a "street view".

Figure 2:
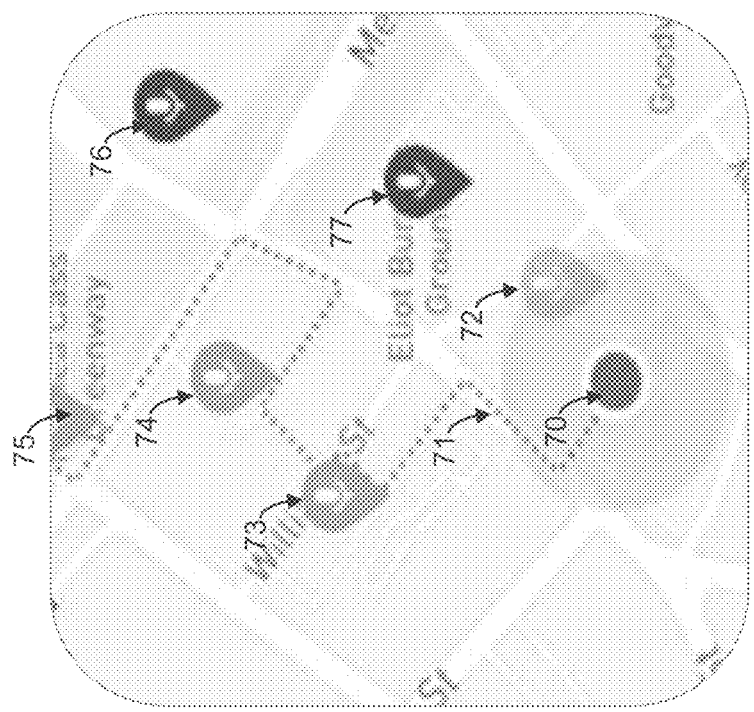
FIG. 2 is an image showing a view of the presently disclosed system.

An example of a user's view showing a route 42 is shown in FIG. 2. The user computing device 4 is or is at location 70, which may be determined by a global positioning system or an internet connection. Geolocations 72-77 are displayed as part of a route 42. If geolocations 72-77 are associated with any audio, they may be referred to as "sound pins." Geolocations 73-75 are part of a path 71, determined by the computer, while geolocations 72, 77, and 76 are unordered. When a user selects a geolocation, a multimedia presentation associated with that geolocation will be played and/or displayed. The user computing device 4 has current selected geolocation 72, which is playing the audio associated therewith. The user may proceed along the ordered geolocations 73-75, either virtually or physically. If a user is physically in the area, the multimedia presentation from a geolocation 72-77 may begin automatically when a user is near the geolocation. However, safety features may be activated if the user computing device is near the route 42, such that no video, or street view is displayed. Directions to the next geolocation may also be shown. If the user is virtually at the location, a series of images or videos, such as a "street view," may be used to show a transition between geolocations. Virtual reality goggles connected to the user computing device may display the street view or other 360 degree panoramic images as if the user was physically at the geolocation.

When zoomed out on the view in FIG. 2, geolocations 72-77 may be clustered into a single representation for a neighborhood. The number of sound pins for a neighborhood may be indicated to the user. Once zoomed in, the clusters may break open into smaller clusters, then individual geolocations.

The computer 1 may also receive information regarding actual or potential real property listing information 36 from agent/owner computing device 3 or external source 5. The real property listing information 36 may be new listings, currently pending listings or recently closed listings. Real property listing information 36 may be associated with a geolocation. If the computer 1 provides a route 42 to the user computing device 4, it may also provide real property listing information 36, which may be displayed to the user along with the route 42. The real property listing information 36 may be used to provide an additional geolocation along the path, to which the computer may provide directions. Some real property listings information 36 may only appear with certain routes 42, such as those for a particular agent or owner.

The user may provide feedback 44 to the computer 1. The feedback 44 may include feedback regarding the route 42. The feedback 44 may also include additional or updated personal information or preferences for a potential home. The feedback 44 may also include a request to see a listing or meet with a particular agent/owner.

When the user selects a route 42 or an individual geolocation within a route, the computer 1 may save information regarding the selection in the database 2. For example, saved information may include a unique event ID, the user's name, the type of account, the geolocation, and information about the route 42 or the individual geolocation, such as its geolocation, creator, and creator's account type. Such information may be used to track population and migration trends, travel and tourism, and/or real estate lead generation and marketing.

The computer 1 may send notifications 35 to the agent/owner device 3. Notifications 35 may be sent when a user computing device 4 accesses a route 42 prepared by the agent/owner device 3. Notifications 35 may also be sent when a user updates their preferences, accesses a route 42, or provides feedback regarding a route 42. Notifications 35 may include information about a user, such as from a user account 13. The computer 1 may also provide agents/owners with reports showing potential home seekers that are active migration trends, performance and where to focus marketing efforts for listings.

In addition, computer 1 may send notifications 35 that provide information about a return of investment to the agent/owner device 3. Such notifications may include the total number of views for that agent's sound pins, the city/state of origin for each view, views of the agent/owner profile 12, and number of contacts made through the platform.

Advertisements 62 may also be provided to the computer by advertisers 6. Advertisements 62 may be associated with an advertisement geolocation. Advertisements 62 may be displayed to users along with route 42. If the computer 1 provides a route 42 to the user computing device 4, it may also provide the advertisement 62, which may be displayed to the user along with the route 42. The advertisement 62, if it is associated with a geolocation, may be added to the path, to which the computer may provide directions. This may be useful to promote local businesses and restaurants, including interior designers, relocation services, moving services, and building/construction companies. Alternatively, advertisements 62 may be provided to agent/owner computing device 3 to entice them to include specific businesses, such as museums and tourist attractions, in their route 42. The computer 1 may also send notifications 61 to advertisers 6 based on served or engaged advertisements 62.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for providing curated real estate data comprising:
   a computer;
   a database accessible to said computer for storage and retrieval of real estate data;
   an agent computing device in remote data communication with said computer;
   at least two geolocations provided to said computer by said agent computing device;
   a multimedia recording device connected to said agent computing device;
   at least two multimedia presentations captured by said multimedia recording device and transmitted to said computer by said agent computing device;
   a route created by software on said agent computing device associating at least one of said multimedia presentations with each of said geolocations, said route uploaded to said computer for storage on said database;
   a user computing device including a display and speakers for remotely accessing said route through said computer; and
   a variable presentation path generated by software on said computer by combining a route requested by said user computing device with a geolocation of said user computing device, such that if said user computing device is near a geolocation of the requested route said variable presentation path includes travel directions, and if said user device is far from a geolocation of the requested route said variable presentation path includes a street view.

2. The system of claim 1, the user computing device having a global positioning system device for determining the geolocation of the user computing device.

3. The system of claim 1, wherein the computer presents a plurality of routes for the user computer device to access.

4. The system of claim 3, wherein the plurality of routes is selected in response to a request by the user computer device including personal information.

5. The system of claim 4, wherein the personal information includes at least one of a user's name, age, sex, current home address, zip code, general area, and preferences for a potential home, such as a neighborhood, number of bedrooms, bathrooms, price, home type.

6. The system of claim 4, wherein the computer provides the request to an agent computing device.

7. The system of claim 1, further comprising a multimedia presentation retrieved from an external source.

8. The system of claim 1, wherein the multimedia presentation is audio.

9. The system of claim 1, wherein the multimedia presentation is video.

10. The system of claim 1, the user computing device providing feedback based on the route.

11. The system of claim 10, wherein the computer provides the feedback to the agent computing device.

12. The system of claim 1, further comprising software executing on said computer for receiving real property listing information and associating the real property listing information with the route.

13. The system of claim 1, further comprising an advertiser computing device providing an advertisement and associated with an advertisement geolocation, wherein the advertisement is displayed to the user computing device with the route if the advertisement geolocation is near at least one of the two geolocations.

14. The system of claim 1, further comprising virtual reality goggles connected to the user computing device for displaying at least one of the multimedia presentations and the street view.

15. The system of claim 1, wherein the agent computing device is associated with the owner of a property.

16. The system of claim 1, wherein the multimedia recording device is a camera or microphone.

* * * * *